United States Patent
Ohtani

(10) Patent No.: US 6,172,761 B1
(45) Date of Patent: *Jan. 9, 2001

(54) IMAGE PROCESSING DEVICE

(75) Inventor: Masaki Ohtani, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/919,283

(22) Filed: Aug. 28, 1997

(30) Foreign Application Priority Data

Aug. 30, 1996 (JP) .................................................. 8-229537
Oct. 7, 1996 (JP) .................................................. 8-265755

(51) Int. Cl.$^7$ .......................................................... B41B 3/02
(52) U.S. Cl. ................................. 358/1.12; 358/1.14-1.16; 358/405; 358/444; 358/524; 358/527; 358/570; 399/111
(58) Field of Search .......................... 395/112, 114–116, 395/570; 358/405, 444, 527, 524, 1.12, 1.14–1.16; 399/111

(56) References Cited

U.S. PATENT DOCUMENTS 5,638,511 * 6/1997 Nezu ................................ 395/187.01

FOREIGN PATENT DOCUMENTS

| 2-130564 | 5/1990 | (JP) . | |
|---|---|---|---|
| 3-67870 | * 3/1991 | (JP) | ................................ 399/111 |
| 4-173395 | 6/1992 | (JP) . | |
| 5-107852 | 4/1993 | (JP) . | |
| 7-299936 | 11/1995 | (JP) . | |

OTHER PUBLICATIONS

Tektronix Phaser 550 Features, Jan. 8, 1996.*
Tektronix Phaser 550 Specifications, Jan. 8, 1996.*
Tektronix Phaser 550 Sales Advertisement, Jan. 8, 1996.*
Letter from German Patent Office regarding applicant's claims, Feb. 3, 1998.*
Tektronix Phaser 550 Color Printer: Specifications, Features, Newsletter announcing release, 1990.*
Tektronix Phaser 550 User's Guide, pp. 7–1 to 7–5, Feb. 1996.*

* cited by examiner

Primary Examiner—Mark Zimmerman
Assistant Examiner—Lance W. Sealey
(74) Attorney, Agent, or Firm—Oblon, Spivak, McClelland, Maier & Neustadt, P.C.

(57) ABSTRACT

An image processing device of the present invention includes a storage for storing image data and a printer for printing images on a plurality of copies of sheets in accordance with the image data. The printer produces a single copy of printings at a time on the basis of a plurality of pages of image data stored in the storage. When a plurality of copies of printings are desired, and if a copy proof mode is selected, the operation of the printer is interrupted before the printer produces the second copy of printings. The operation of the printing section is resumed in response to a print restart command. The image processing device therefore allows the operator desiring a plurality of copies of printings to proof a printed image before the image is printed on the second sheet.

12 Claims, 5 Drawing Sheets

IMAGE PROCESSING DEVICE

FIELD OF THE INVENTION

BACKGROUND OF THE INVENTION

The present invention relates to an image processing device including a storage for storing image data and a printer capable of printing images on a plurality of copies of sheets on the basis of the image data.

DISCUSSION OF THE BACKGROUND

A printer connected to a host computer belongs to a family of image processing devices. This kind of printer includes a storage for storing image data input from the host computer, and prints images on a plurality of copies of sheets in accordance with the image data. Therefore, when the same image is to be printed on a plurality of sheets, it is not necessary for the host computer to send the same image data to the printer every time the printer produces a single printing. This successfully reduces the interval between the printing of the image on a sheet and the printing of the same image on another sheet.

When a plurality of copies of printings are desired, the printer repeats its printing operation until the desired number of copies have been produced. This, however, brings about the following problem. Assume that image data different from desired image data are input to the printer by accident, or that image data to be printed out include errors. Then, the operator is apt to cause the printer to start operating without noticing such an occurrence. Although the operator may notice input errors or data errors by looking at printings actually produced, the sheets carrying unexpected images must be simply discarded. This is particularly true with a high speed printer in which the interval between the consecutive printings is short.

In light of the above, when the operator desires a plurality of copies of printings, the operator selects desired image data on the host computer, inputs the number of copies, and then enters a print start command for producing only a single copy of printings. After proofing the single copy of printings, the operator again selects the above image data, inputs the number of copies, and enters the print start command for producing all the desired number of copies of printing. Such a procedure allows the operator to correct any input error or data error found in the first copy of printings on the host computer, and to then carefully select the image data on the computer. This prevents images to be wastefully printed on a plurality of sheets. However, proofing the whole copy of printings and again inputting the desired number of copies on the host computer is time- and labor-consuming.

SUMMARY OF THE INVENTION

It is therefore an object of the present invention to provide an image processing device which allows the operator desiring a plurality of copies of printings to proof a printed image before the image is printed on the second sheet.

In accordance with the present invention, an image processing device includes a storage for storing image data and a printing section for printing images on sheets. A print control section controls the printing section in accordance with the image data stored in the storage. A copy proof mode setting section sets up a copy proof mode. A copy proof mode control section causes, when the copy proof mode is set and when a plurality of copies of printings are desired, the printing section to stop an operation for producing the second copy of printings. A print restart command inputting section inputs a print restart command. A print restarting section causes the printing section to restart its operation in response to the print restart command.

Also, in accordance with the present invention, an image processing device includes a storage for storing image data and a printing section for printing images on sheets. A print control section controls the printing section in accordance with the image data stored in the storage. A page proof mode setting section sets up a page proof mode. A page proof mode control section causes, when the page proof mode is set and when a plurality of copies of printings are desired, the printing section to stop an operation for printing the image on the sheet of relatively low number. A print restart command inputting section inputs a print restart command. A print restarting section causes the printing section to restart the operation in response to the print restart command.

Further, in accordance with the present invention, an image processing device includes a storage for storing image data, a printing section for printing images on sheets, and a display for displaying information. A print control means controls the printing section in accordance with the image data stored in the storage. An electronic lock mode setting section sets up an electronic lock mode. An electronic lock mode control section causes, when the electronic lock mode is set and when a plurality of copies of printings are desired, the printing section to stop an operation for producing the first copy of printings. A display control section displays, when the operation of the printing section is interrupted, identification information relating to the image data to be printed out on the sheets on the display. A print restart command inputting section inputs a print restart command. A print restarting section causes the printing section to restart its operation in response to the print restart command.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
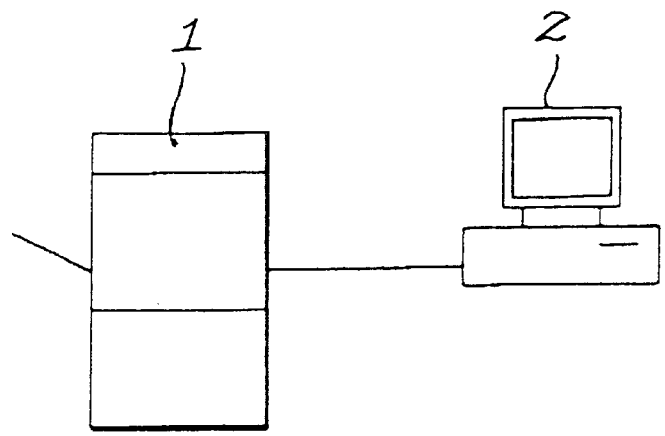
FIG. 1 is a front view showing a multifunction printer (MFP) to which an image processing device embodying the present invention is applied, and a host computer to which the MFP is connected.
Figure 2:
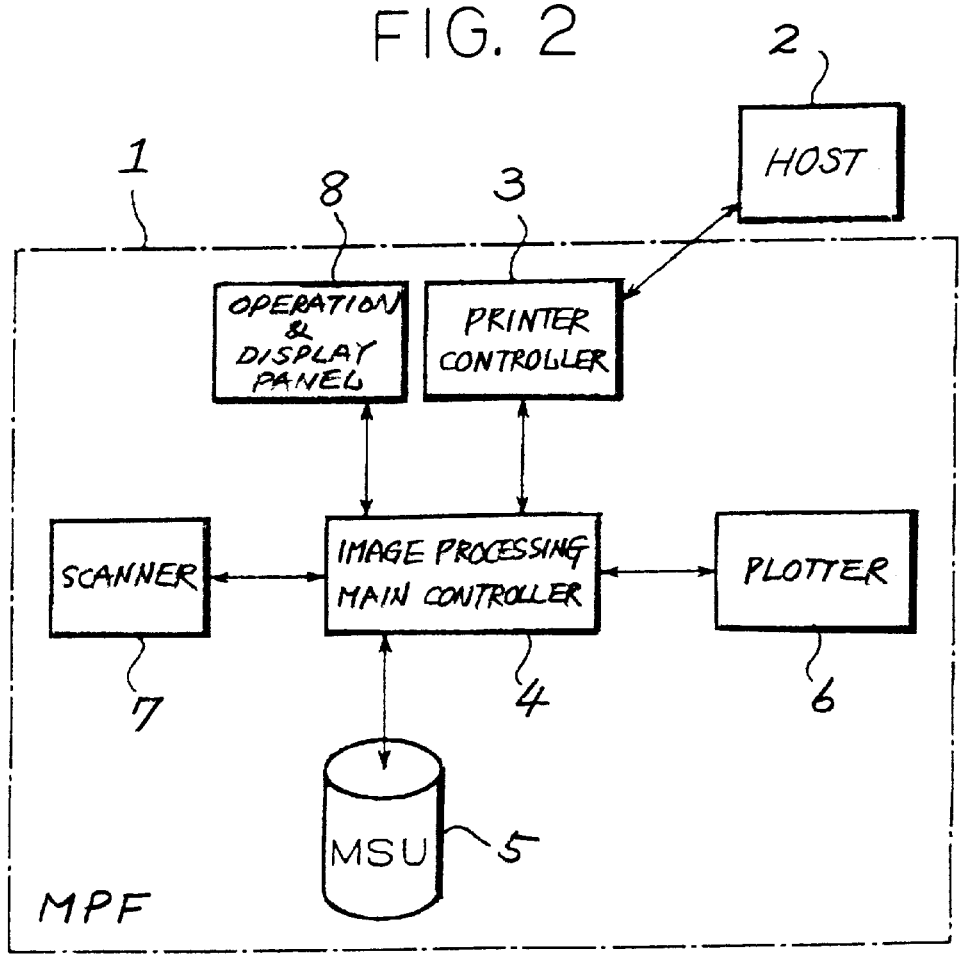
FIG. 2 is a block diagram schematically showing the electrical arrangement of the MFP.

Referring to FIG. 1 of the drawings, an MFP 1 to which an image processing device embodying the present invention is applied is shown. As shown, the MFP 1 is connected to a host computer, or simply host as referred to hereinafter, 2. As shown in FIG. 2, the MFP 1 includes a printer controller 3 for transforming print data received from the host 2 to bilevel image data. An image processing main controller 4 is connected to the printer controller 3. A memory superdrive unit (MSU) 5 and a plotter 6 are connected to the image processing main controller 4. The MSU 5 is capable of storing image data efficiently. The plotter or printing section 6 prints an image on a sheet, not shown. The MFP 1 additionally includes a scanner 7 for reading an image out of a document. The scanner 7 is connected to the image processing main controller 4. Further connected to the image processing main controller 4 is an operation and display panel 8.

Figure 3:
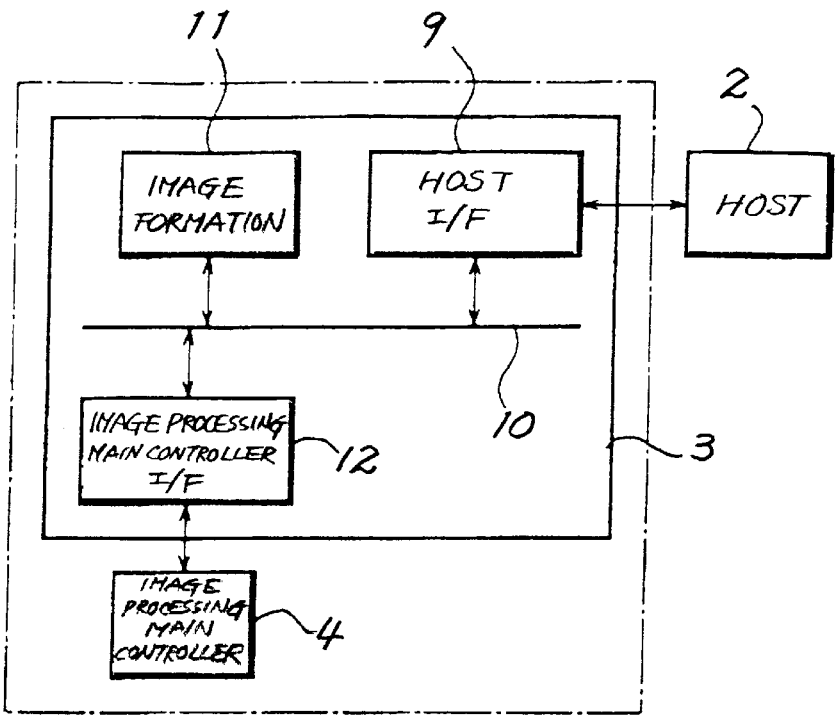
FIG. 3 is a block diagram schematically showing the electrical arrangement of a printer controller included in the MFP.

As shown in FIG. 3, the printer controller 3 includes a host interface (I/F) connected to the host 2 at one end and to a bus 10 at the other end. Also connected to the bus 10 are an image formation 11 and a a main controller I/F 12. The image formation 11 converts input print data to bilevel image data. The main controller I/F 12 is connected to the image processing main controller 4.

Figure 4:
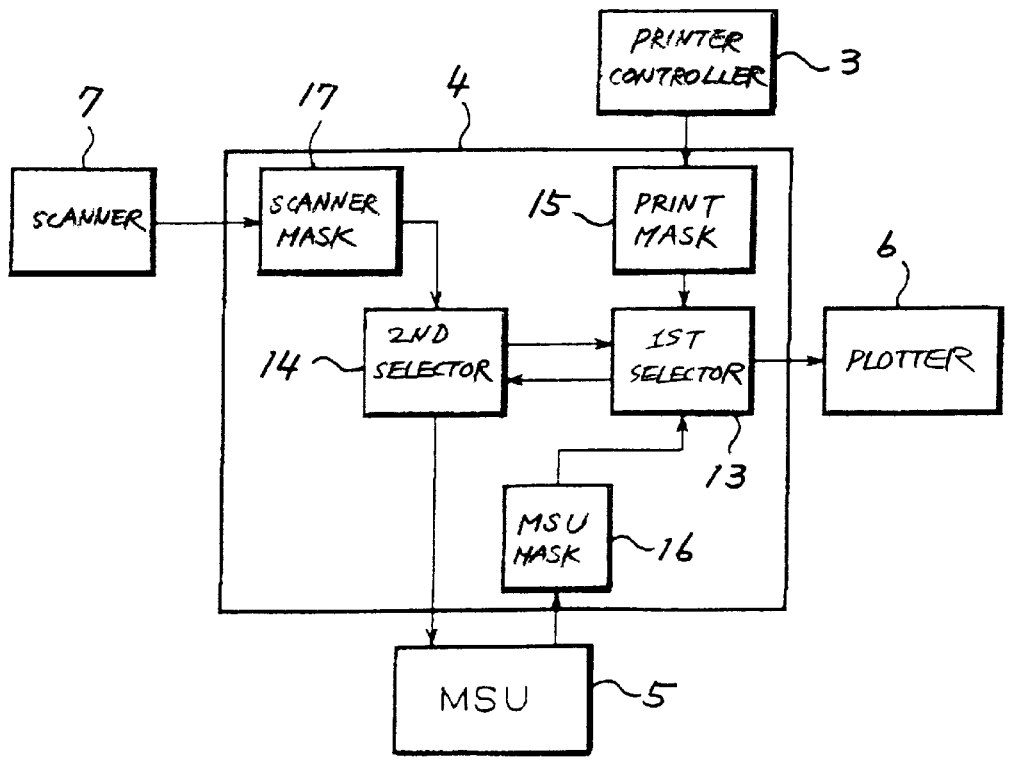
FIG. 4 is a schematic block diagram showing the configuration of an image processing main controller also included in the MFP.

FIG. 4 shows the image processing main controller 4 in detail. As shown, the main controller 4 includes a first and a second selector 13 and 14. The two selectors 13 and 14 are so constructed as to selectively transfer image data input from the printer controller 3 or the scanner 7 to the MSU 5 or the plotter 6. The first selector 13 delivers image data output from the MSU 5 to the plotter 6. A print mask 15 is connected to the first selector 13 in order to selectively input image data received from the printer controller 3 to the selector 13. An MSU mask 16 is also connected to the first selector 13 for selectively inputting image data output from the MSU 5 to the selector 13. A scanner mask 17 is connected to the second selector 14 for selectively inputting image data output from the scanner 7 to the selector 14.

The MSU 5 includes a local storage, not shown, for storing image data input from the image processing main controller 4. The MSU 5 is so configured as to store image data in the local storage efficiently.

The operation and display panel 8 includes a restart key and a cancel key as well as other conventional keys. The restart key is used to input a print restart command.

Figure 5:
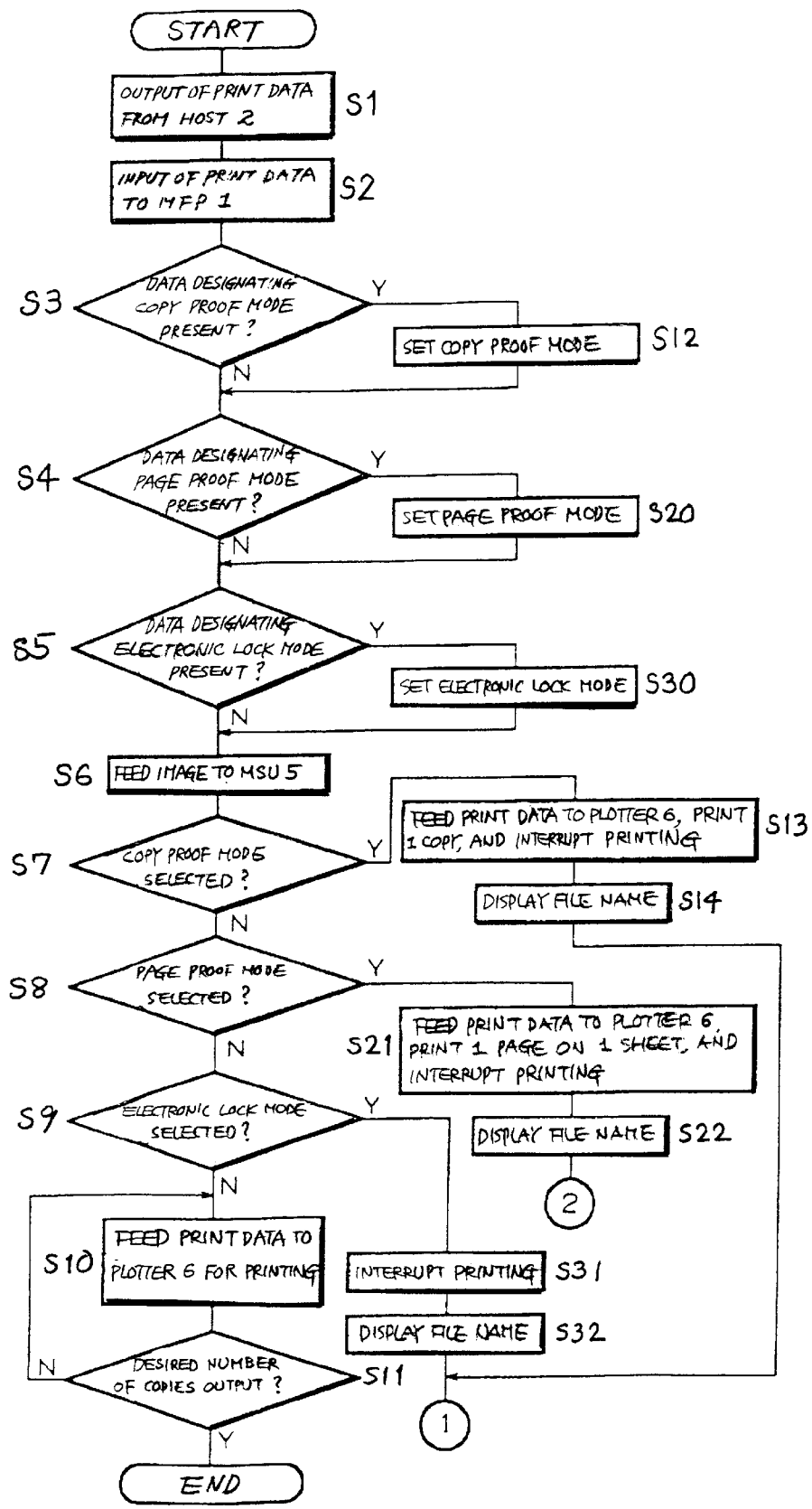
FIG. 5 is a flowchart demonstrating a specific operation of the MFP.
Figure 6:
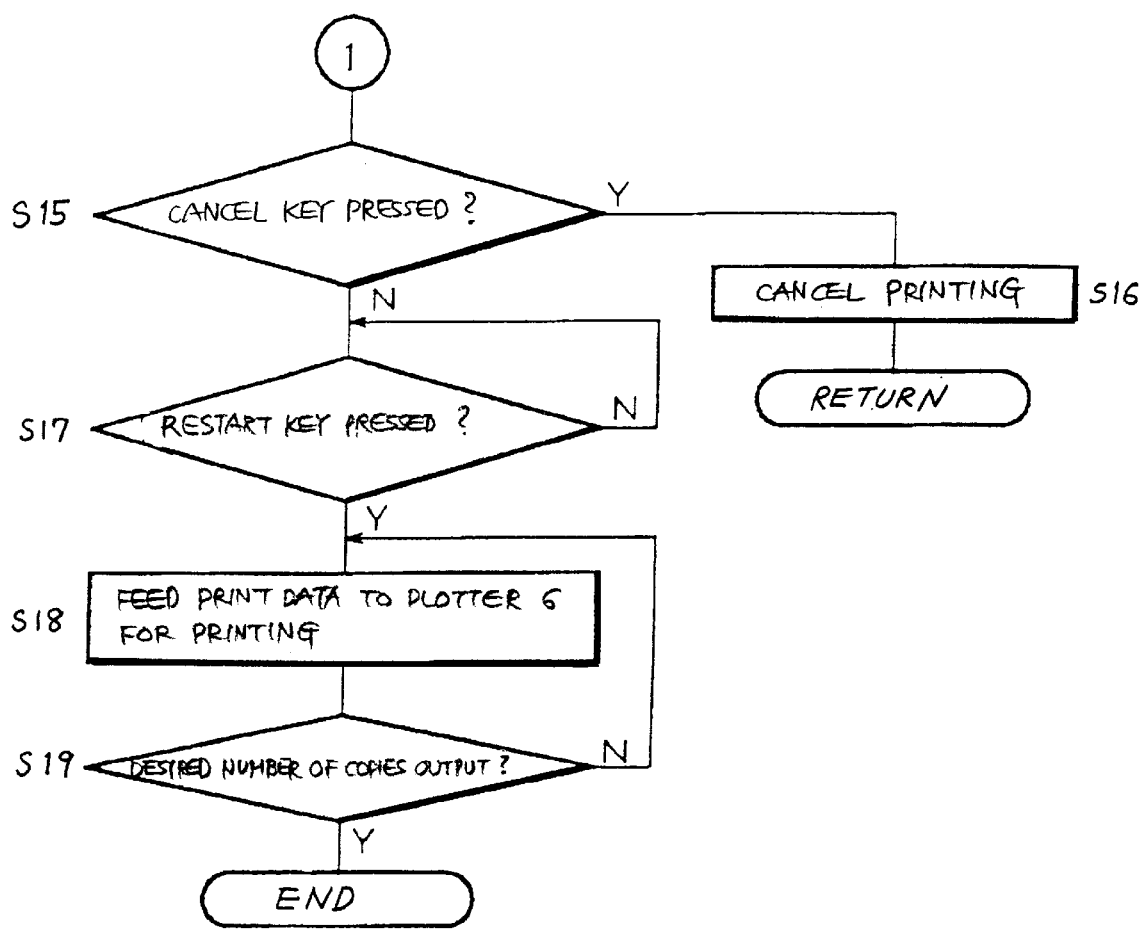
FIG. 6 is a flowchart representative of an operation to be executed by the MFP after the interruption of a printing operation in a copy proof mode or an electronic lock mode.
Figure 7:
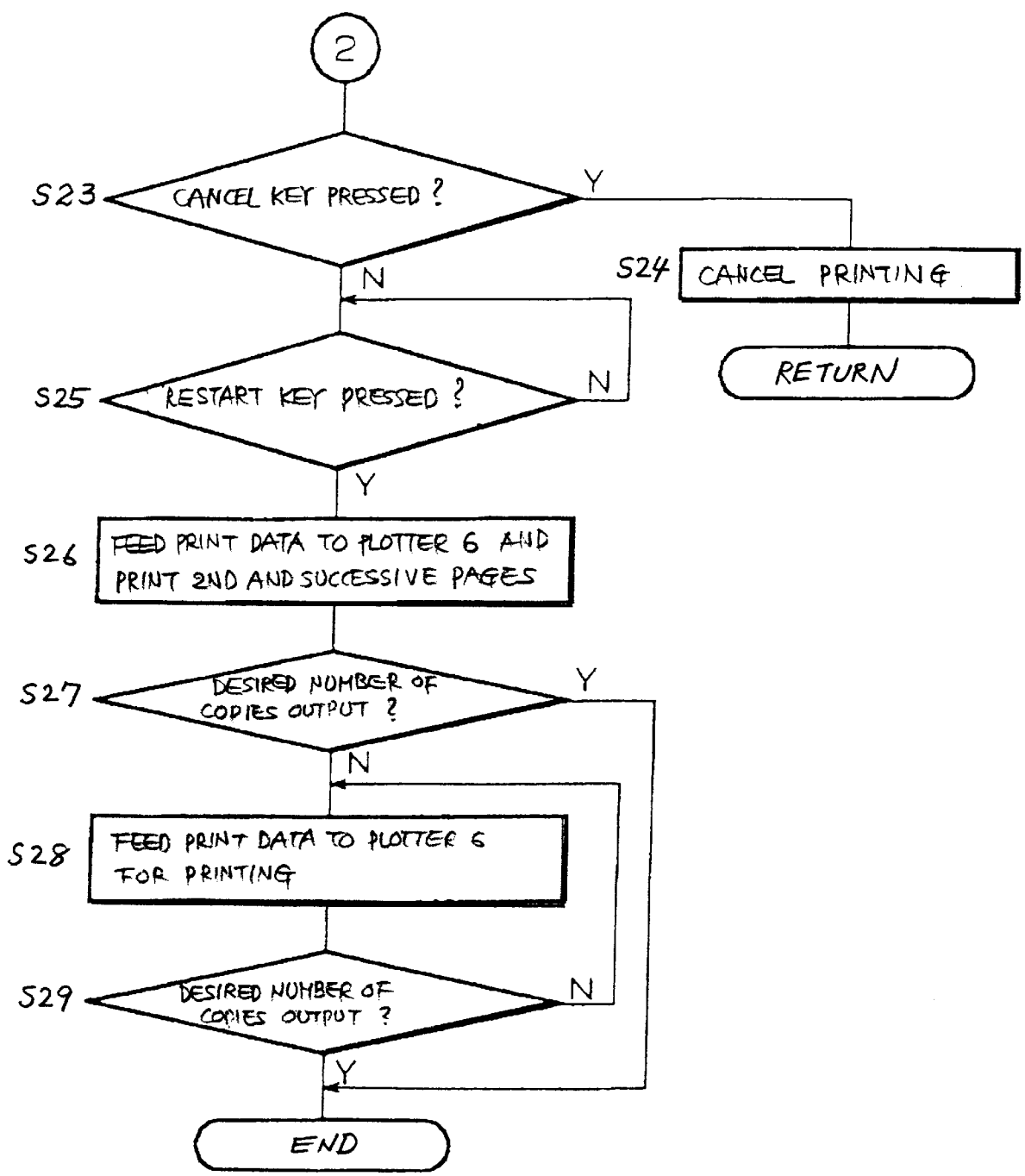
FIG. 7 is a flowchart representative of an operation to be executed by the MFP after the interruption of a printing operation in a page proof mode.

Reference will be made to FIGS. 5–7 for describing a specific operation of the MFP 1. A copy proof mode, a page proof mode and an electronic lock mode are available with the MFP 1, as will be described specifically later.

First, assume that the operator selects none of the copy proof mode, page proof mode and electronic lock mode and desires to print out a plurality of pages of print data stored in the host 2. Then, the operator selects desired print data on the host 2, inputs a desired number of copies of printings, and inputs a print start command. In response, the host 2 sends to the MFP 1 a print start command, designated print data, and information relating to the desired number of copies of printings (step S1). The command, print data and information are input to the host I/F of the MFP 1 (step S2). The MFP 1 determines that the received data do not contain data designating the copy proof mode, (N, step S3) or data designating the page proof mode (N, step S4) or data designating the electronic lock mode (N, step S5).

Subsequently, the print data input to the MFP 1 are transformed to image data by the image formation 11 page by page. All the pages of image data are fed to the MSU 5 via the image processing main controller I/F 12 and image processing main controller 4 and written to the local storage (step S6). In this manner, the operation for recording image data is implemented as the function of storing means.

The MFP 1 determines whether or not the copy proof mode is selected (step S7), whether or not the page proof mode is selected (step S8), and whether or not the electronic lock mode is selected (step S9). Because none of the three modes is selected, the image data are read out of the local storage while being held therein. The image data are fed from the MSU 5 to the plotter 6 via the image processing main controller 4. The plotter 6 sequentially prints the consecutive pages of images on sheets until the desired number of copies of printings have been output (step S10). In this manner, the operation for driving the plotter 6 in accordance with image data and thereby printing images on sheets is implemented as the function of print control means.

The MFP 1 determines whether or not the desired number of copies of printings have been output (step S11). The step S10 is repeated until the answer of the step S11 changes from negative (N) to positive (Y). If the answer of the step S11 is Y, the MFP 1 ends its operation.

A copy proof mode operation is as follows. Assume that the operator selects desired print data, inputs a desired number of copies of printings, selects the copy proof mode, and enters a print start command on the host 2. In response, the host 2 outputs data designating the copy proof mode together with a print start command, desired print data, and information relating to the number of copies of printings (step S1). The data designating the copy proof mode is input to the host I/F 9 of the MFP 1 together with the other data (step S2). The MFP 1 determines whether or not the input data contain data designating the copy proof mode (step S3). Because the answer of the step S3 is Y, the MFP 1 sets up the copy proof mode (step S12). In this manner, the operation for setting up the copy proof mode is implemented as the function of copy proof mode setting means.

The MFP 1 determines that the input data do not contain data designating the page proof mode (N, step S4) or data designating the electronic lock mode (N, step S5). As a result, all the pages of image data are written to the local storage. The MFP 1 determines that the copy proof mode is selected (Y, step S7). Then, the image data are read out of the local storage while being held therein, and fed to the plotter 6. The plotter 6 is driven in accordance with the image data and sequentially prints the consecutive pages of images on sheets until a single copy of printings have been output. When a single copy of printings are output, the MFP 1 ends its operation (step S13). In this manner, when a plurality of copies of printings are desired and if the copy proof mode is selected, copy proof mode control means functions to interrupt the operation of the plotter 6 before the plotter 6 prints the second copy of printings. At this instant, the operation and display panel 8 displays a file name, i.e., identification (ID) information relating to the image data printed out on the sheets (step S14).

The operator proofs the single copy of printings and determines, based on the images printed on the sheets and the file name, whether or not they are free from errors. If the printings include any error, the operator presses the cancel key provided on the operation and display panel 8. In response, as shown in FIG. 6, the MFP 1 determines that the cancel key is pressed (Y, step S15), and then ends the printing operation (step S16).

If the above printings are free from errors, the operator presses a restart key also provided on the operation and display panel 8. In response, the MFP 1 determines that the cancel key is not pressed (N, step S15), and that the restart key is pressed (Y, step S17). When the restart key is pressed, a print restart command is output. In response, the image data are read out of the local storage while being held therein, and fed to the plotter 6. The plotter 6 is again driven in accordance with the image data and sequentially prints the images of consecutive pages on sheets until another copy of printings have been output (step S18). In this manner, when the operator presses the restart key while the printing operation is interrupted, print restarting means restarts the printing operation in response to the resulting print restart command.

The MFP 1 determines whether or not the desired number of copies of printings are output (step S19). The step S18 is repeated until the answer of the step S19 changes from N to Y. If the answer of the step S19 is Y, the MFP 1 ends its operation.

As stated above, when the copy proof mode is selected, the plotter 6 once stops operating before printing the second copy of printings and allows the operator to proof the first copy of printings. The operator can therefore correct the erroneous data. This obviates the wasteful consumption of sheets. In addition, to resume the printing operation of the MFP 1, the operator should only touch the restart key.

Assume that the operator selects desired print data, inputs a desired number of copies of printings, designates the page proof mode, and enters a print start command. In response, the host 2 outputs data designating the page proof mode together with a print start command, desired print data, and information relating to the number of copies of printings (step S1). The data designating the page proof mode is input to the host I/F 9 of the MFP 1 together with the other data (step S2). The MFP 1 determines whether or not the input data contain data designating the page proof mode (step S3). Because the answer of the step S3 is N, the MFP 1 determines whether or not data designating the page proof mode is present (step S4). Because the answer of the step S4 is Y, the MFP 1 sets up the page proof mode (step S20). In this manner, the operation for setting up the page proof mode is implemented as the function of page proof mode setting means.

The MFP 1 determines that the input data do not contain data designating the electronic lock mode (N, step S5). As a result, all the pages of image data are written to the local storage. The MFP 1 determines that the copy proof mode is not selected (N, step S7). The MFP 1 determines that the page proof mode is selected (Y, step S8). Then, the image data are read out of the local storage while being held therein, and fed to the plotter 6. The plotter 6 is driven in accordance with the image data and prints the image of the first page on a single sheet. On printing the first page on a single sheet, the MFP 1 once stops its operation (step S21). In this manner, when a plurality of copies of printings are desired and if the page proof mode is selected, page proof mode control means functions to interrupt the operation of the plotter 6 before the plotter 6 prints the second page on the next sheet. Again, the operation and display panel 8 displays a file name, i.e., ID information relating to the image data printed out on the sheet (step S22).

The operator proofs the single printing and determines, based on the image printed on the sheet and the file name, whether or not it is free from errors. If the printing includes any error, the operator presses the cancel key provided on the operation and display panel 8. In response, as shown in FIG. 7, the MFP 1 determines that the cancel key is pressed (Y, step S23), and then ends the printing operation (step S24).

If the above printing is free from errors, the operator presses the restart key on the operation and display panel 8. In response, the MFP 1 determines that the cancel key is not pressed, and that the restart key is pressed (Y, step S25). When the restart key is pressed, a print restart command is output. In response, the image data are read out of the local storage while being held therein, and fed to the plotter 6. The plotter 6 is again driven in accordance with the image data and sequentially prints the images of the second page and successive pages on sheets. These pages are combined with the first page produced in the step S21, completing a single copy (step S26). In this manner, when the operator presses the restart key while the printing operation is interrupted, the print restarting means restarts the printing operation in response to the resulting print restart command.

The MFP 1 determines whether or not the desired number of copies of printings are output (step S27). If the answer of the step S27 is Y, the MFP 1 ends its operation. If the answer of the step S27 is N, the image data are repeatedly read out of the local storage while being held therein. The plotter 6 sequentially prints the images of the consecutive pages on sheets in accordance with the image data until another copy of printings have been output (step S28). Subsequently, the MFP 1 determines whether or not the desired number of copies of printings have been output (step S29). The step S18 is repeated until the answer of the step S29 changes from N to Y. If the answer of the step S29 is Y, the MFP 1 ends its operation.

As stated above, when the page proof mode is selected, the plotter 6 once stops operating before printing the second page on the second sheet and allows the operator to proof the first page or printing. The operator can therefore correct erroneous data. This also obviates the wasteful consumption of sheets. In addition, to resume the printing operation of the MFP 1, the operator should only touch the restart key.

Assume that the operator selects desired print data, inputs a desired number of copies of printings, selects the electronic lock mode, and enters a print start command. In response, the host 2 outputs data designating the electronic lock mode together with a print start command, desired print data, and data relating to the number of copies of printings (step S1). The data designating the electronic lock mode is input to the host I/F 9 of the MFP 1 together with the other data (step S2). The MEP 1 determines that the input data do not contain data designating the copy proof mode (N, step S3) or data designating the page proof mode (N, step S4). Then, the MFP 1 determines whether or not the input data contain data designating the electronic lock mode (step S5). Because the answer of the step S5 is Y, the MFP 1 sets up the electronic lock mode (step S30). In this manner, the operation for setting up the electronic lock mode is implemented as the function of electronic lock mode setting means.

All the pages of image data are written to the local storage (step S6). The MFP 1 determines that the copy proof mode is not selected (N, step S7), and that the page proof mode is not selected (N, step S8). The MFP 1 determines that the electronic lock mode is selected (Y, step S9), and does not operate (step S31). In this manner, when a plurality of copies of printings are desired and if the electronic lock mode is selected, electronic lock mode control means functions to prevent the plotter 6 from outputting the first copy of printings. At this instant, the operation and display panel 8 displays a file name, i.e., ID data relating to the image data printed out on the sheets (step S32).

The operator determines, based on the file name appearing on the operation and display panel 8, whether or not the data to be printed out are free from input errors. If the data include any input error, the operator presses the cancel key provided on the operation and display panel 8. In response, as shown in FIG. 6, the MFP 1 determines that the cancel key is pressed (Y, step S15), and stops its operation (step S16).

If the data to be printed out are free from input errors, the operator presses the restart key on the operation and display panel 8. In response, the MFP 1 determines that the cancel key is not pressed (N, step S 15), and that the restart key is pressed (Y, step S 17). When the restart key is pressed, a print restart command is output. In response, the plotter 6 is driven in accordance with the image data and sequentially prints the images of consecutive pages on sheets until a single copy of printings have been output (step S18).

As stated above, when a plurality of copies of printings are desired and if the electronic lock mode is selected, the plotter 6 is prevented from printing even the first copy of printings and allows the operator to confirm the file name relating to the image data before the image data are actually printed out on sheets. The operator can therefore correct input errors or data errors. This also obviates the wasteful consumption of sheets. In addition, to resume the printing operation of the MFP 1, the operator should only touch the restart key.

The illustrative embodiment has concentrated on a procedure in which a plurality of pages of image data are printed out copy by copy. Alternatively, each page of image data may be continuously printed out on a desired number of sheets at a time. In such a case, in the copy proof mode or the page proof mode, the MFP 1 will stop operating before printing each page on the second sheet. In the electronic lock mode, the MFP 1 will stop operating before printing each page on the first sheet.

In the above embodiment, the operator is assumed to select one of the copy proof mode, page proof mode and electronic lock mode on the host 2 and cause the host 2 to transfer the mode selected to the MFP 1. Alternatively, the MFP 1 may be provided with a copy proof mode key, a page proof mode key and an electronic lock mode key thereon which can be selectively pressed by the operator.

In the page proof mode, the MFP 1 is assumed to stop its operation before printing an image on the second sheet. Alternatively, the MFP 1 may stop its operation before printing an image on the third sheet or the fourth sheet, if desired.

In the illustrative embodiment, the printings are simply sequentially driven out of the MFP 1. If desired, the MFP 1 may include a finishing section in order to, e.g., staple, punch, sort, stack, reorient or otherwise finish the printings. In this case, finish mode setting means for setting a finish mode input on the host 2 is used in addition to the previously stated mode setting means. The finishing section is communicated to the sheet outlet of the plotter 6 and performs a finishing operation when the finish mode is selected. In the finish mode, whether or not the finishing operation should be executed is determined together with, e.g., the position and the number of finishing points. For example, the operator may input "punching A4 vertical sheets at two points of upper edge".

With the MFP 1 having the finishing section, it is possible to subject the printings output from the plotter 6 to finishing of a desired kind. Because the MFP 1 can produce a plurality of copies of printings at a high speed, as stated earlier, a plurality of copies of, e.g., stapled printings are achievable at a high speed.

If finishing data input on the host 2 are erroneous, then a great amount of printings finished in an unexpected way will be produced. In light of this, it is preferable to provide a finish data changing section accessible for inputting a finish mode data change command when the print restart command is to be input in, e.g., the copy proof mode. The finish data changing section will be accompanied by finish mode data changing means for changing the finish mode data, as needed.

In the copy proof mode or the page proof mode, the MFP 1 produces only a small number of printings despite a plurality of copies of printings selected, and then interrupts its operation. Therefore, only such a small number of printings are finished. This allows the operator to see both the printing condition and the finishing condition at the same time. Only if both the printing condition and the finishing condition are satisfactory, the operator will input the print restart command so as to resume printing and finishing.

When the finishing condition is not satisfactory, the operator inputs the finish mode data change command before the print restart command. As a result, the finish mode data input on the host 2 are changed and allow the printings to be finished in the corrected way. This prevents a plurality of copies of printings from being output while being finished in an unexpected manner, and thereby obviates the wasteful consumption of sheets.

In summary, in accordance with the present invention, print control means causes a printing section to print images on sheets while controlling it on the basis of image data stored in storing means. When a copy proof mode is selected, proof mode control means causes the printing section to interrupt its operation before printing the second copy of printings. Subsequently, when a print restart command is input on a print restart command inputting section, print restarting means causes the printing section to resume its operation. The operator can therefore proof the printings and correct errors before the second copy of printings are produced. This obviates the wasteful consumption of a great number of sheets. In addition, to resume the printing operation, the operator should only input the print restart command on the print restart command inputting section. The operator is therefore free from time- and-labor consuming operation.

When a page proof mode is selected on page proof mode setting means, and if a plurality of copies of printings are desired, page proof mode control means causes the printing section to stop its operation for printing an image on a sheet of relatively low number. Then, in response to the print restart command, print restarting means causes the printing section to resume its operation. This allows the operator to proof the printing output before an image is printed on the sheet of relatively low number, and to correct errors. As a result, the wasteful consumption of a great number of sheets is obviated. In addition, to resume the printing operation, the operator should only input the print restart command on the print restart command inputting section. It is to be noted that the sheet of relatively low number refers to the second sheet or any sheet following it, i.e., one of small number of sheets smaller than the total number of sheets to constitute a single copy.

When an electronic lock mode is selected on electronic lock mode setting means, and if a plurality of copies of printings are desired, electronic lock mode control means causes the printing section to stop its operation for outputting the first copy of printings. At this instant, display control means displays ID information relating to image data to be printed. Subsequently, in response to the print restart command, the print restarting means causes the printing section to resume its operation. The operator can therefore confirm the ID information before even the first copy of printings are produced. This also has the advantages stated above.

When the operator desires a plurality of copies of printings, the operator can see both the printing condition and the finishing condition when only a small number of printings are produced at the beginning of the copy proof mode operation or the page proof mode operation. Therefore, if only the finishing condition is not satisfactory, the operator can change finish mode data and then restart the printing operation. This prevents a plurality of copies of printings from being produced in an undesirable finishing condition, and thereby obviates the wasteful consumption of sheets.

Various modifications will become possible for those skilled in the art after receiving the teachings of the present disclosure without departing from the scope thereof.

What is claimed is:

1. An image processing device comprising:
   storing means for storing image data;
   a printing section for printing images on sheets;
   print control means for controlling said printing section in accordance with the image data stored in said storing means;
   copy proof mode setting means configured to allow an operator to set up a copy proof mode;
   copy proof mode control means for causing, when said copy proof mode is set by the operator and when a plurality of copies of a set of printings are desired, the set including multiple pages, said printing section to print out one copy of the multiple pages of the set of printings and to stop an operation for producing a second copy of the multiple pages of the set of printings, wherein said copy proof mode control means further stores input image data in said storing means and causes the image data to be stored in said storing means even after a set of printings have been completed;
   print restart command inputting means configured to allow the operator to input a print restart command; and
   print restarting means for reading the image data out of the storing means and for causing said printing section to restart said operation in response to said print restart command and to print out said read image data.

2. A device as claimed in claim 1, further comprising:
   finish mode setting means for setting a finish mode;
   a finishing section for finishing, when said finish mode is set up, the sheets on which the images are printed;
   finish mode change inputting means for inputting, when said print restart command is to be input, a command for changing finish mode data set; and
   finish mode data changing means for changing the finish mode data in response to said command output from said finish mode change inputting means.

3. An image processing device comprising:
   storing means for storing image data;
   a printing section for printing images on sheets;
   print control means for controlling said printing section in accordance with the image data stored in said storing means;
   page proof mode setting means for configured to allow an operator to set a page proof mode;
   page proof mode control means for causing, when said page proof mode is set by the operator and when a plurality of copies of printings are desired, said printing section to stop an operation for printing the image on the sheet of relatively low number;
   copy proof mode setting means configured to allow the operator to set up a copy proof mode;
   copy proof mode control means for causing, when said copy proof mode is set by the operator and when a plurality of copies of a set of printings are desired, the set including multiple pages, said printing section to print out one copy of the multiple pages of the set of printings and to stop an operation for producing a second copy of the multiple pages of the set of printings, wherein said copy proof mode control means further stores input image data in said storing means and causes the image data to be stored in said storing means even after a set of printings have been completed;
   electronic lock mode setting means configured to allow the operator to set up an electronic lock mode;
   electronic lock mode control means for causing, when said electronic lock mode is set by the operator and when a plurality of copies of printings are desired, said printing section to stop an operation for producing a first copy of printings;
   display control means for displaying, when said operation of said printing section is interrupted, identification information relating to the image data to be printed out on the sheets on said display;
   print restart command inputting means configured to allow the operator to input a print restart command; and
   print restarting means for reading the image data out of the storing means and for causing said printing section to restart said operation in response to said print restart command and to print out said read image data.

4. A device as claimed in claim 3, further comprising:
   finish mode setting means for setting a finish mode;
   a finishing section for finishing, when said finish mode is set up, the sheets on which the images are printed;
   finish mode change inputting means for inputting, when said print restart command is to be input, a command for changing finish mode data set; and
   finish mode data changing means for changing the finish mode data in response to said command output from said finish mode change inputting means.

5. An image processing device comprising:
   storing means for storing image data;
   a printing section for printing images on sheets;
   a display for displaying information;
   print control means for controlling said printing section in accordance with the image data stored in said storing means;
   electronic lock mode setting means for configured to allow an operator to set an electronic lock mode in response to a command received from an external apparatus;
   electronic lock mode control means for causing, when said electronic lock mode is set by the operator and when a plurality of copies of printings are desired, said printing section to stop an operation for producing a first copy of printings;
   display control means for displaying, when said operation of said printing section is interrupted, identification information relating to the image data to be printed out on the sheets on said display;

print restart command inputting means configured to allow the operator to input a print restart command; and print restarting means for causing said printing section to restart said operation in response to said print restart command.

6. A device as claimed in claim 5, further comprising:

finish mode setting means for setting a finish mode;

a finishing section for finishing, when said finish mode is set up, the sheets on which the images are printed;

finish mode change inputting means for inputting, when said print restart command is to be input, a command for changing finish mode data set; and finish mode data changing means for changing the finish mode data in response to said command output from said finish mode change inputting means.

7. An image processing device comprising:

storing means for storing image data;

a printing section for printing images on sheets;

print control means for controlling said printing section in accordance with the image data stored in said storing means;

copy proof mode setting means configured to allow an operator to set up a copy proof mode;

copy proof mode control means for causing, when said copy proof mode is set by the operator and when a plurality of copies of a set of printings are desired, the set including multiple pages said printing section to print out one copy of the multiple pages of the set of printings and to stop an operation for producing a second copy of the multiple pages of the set of printings, wherein said copy proof mode control means further stores input image data in said storing means and causes the image data to be stored in said storing means even after a set of printings have been completed;

page proof mode setting means configured to allow the operator to set up a page proof mode;

page proof mode control means for causing, when said page proof mode is set by the operator and when a plurality of copies of printings are desired, said printing section to stop an operation for printing the image on the sheet of relatively low number;

print restart command inputting means configured to allow the operator to input a print restart command; and print restarting means for reading the image data out of the storing means and for causing said printing section to restart said operation in response to said print restart command and to print out said read image data.

8. A device as claimed in claim 7, further comprising:

finish mode setting means for setting a finish mode;

a finishing section for finishing, when said finish mode is set up, the sheets on which the images are printed;

finish mode change inputting means for inputting, when said print restart command is to be input, a command for changing finish mode data set; and finish mode data changing means for changing the finish mode data in response to said command output from said finish mode change inputting means.

9. An image processing device comprising:

storing means for storing image data;

a printing section for printing images on sheets;

print control means for controlling said printing section in accordance with the image data stored in said storing means;

display means for displaying information for identifying an image designated for printing;

copy proof mode setting means configured to allow an operator to set up a copy proof mode;

copy proof mode control means for causing, when said copy proof mode is set by the operator and when a plurality of copies of a set of printings are desired, the set including multiple pages, said printing section to print out one copy of the multiple pages of the set of printings and to stop an operation for producing a second copy of the multiple pages of the set of printings, wherein said copy proof mode control means further stores input image data in said storing means and causes the image data to be stored in said storing means even after a set of printings have been completed;

print restart command inputting means configured to allow the operator to input a print restart command; and print restarting means for reading the image data out of the storing means and for causing said printing section to restart said operation in response to said print restart command and to print out said read image data.

10. A device as claimed in claim 9, further comprising:

finish mode setting means for setting a finish mode;

a finishing section for finishing, when said finish mode is set up, the sheets on which the images are printed;

finish mode change inputting means for inputting, when said print restart command is to be input, a command for changing finish mode data set; and finish mode data changing means for changing the finish mode data in response to said command output from said finish mode change inputting means.

11. An image processing device comprising:

storing means for storing image data;

a printing section for printing images on sheets;

print control means for controlling said printing section in accordance with the image data stored in said storing means;

display means for displaying information for identifying an image designated for printing;

copy proof mode setting means configured to allow an operator to set up a copy proof mode;

copy proof mode control means for causing, when said copy proof mode is set by the operator and when a plurality of copies of a set of printings are desired, the set including multiple pages, said printing section to print out one copy of the multiple pages of the set of printings and to stop an operation for producing a second copy of the multiple pages of the set of printings, wherein said copy proof mode control means further stores input image data in said storing means and causes the image data to be stored in said storing means even after a set of printings have been completed;

page proof mode setting means configured to allow the operator to set up a page proof mode;

page proof mode control means for causing, when said page proof mode is set by the operator and when a plurality of copies of printings are desired, said printing section to stop an operation for printing the image on the sheet of relatively low number;

print restart command inputting means configured to allow the operator to input a print restart command; and print restarting means for reading the image data out of the storing means and for causing said printing section to restart said operation in response to said print restart command and to print out said read image data.

12. A device as claimed in claim 11, further comprising:

finish mode setting means for setting a finish mode;

a finishing section for finishing, when said finish mode is set up, the sheets on which the images are printed;

finish mode change inputting means for inputting, when said print restart command is to be input, a command for changing finish mode data set; and finish mode data changing means for changing the finish mode data in response to said command output from said finish mode change inputting means.

* * * * *